United States Patent [19]

Ikeda et al.

[11] Patent Number: 4,991,281
[45] Date of Patent: Feb. 12, 1991

[54] METHOD OF MODIFICATION OF PRODUCTION LINE APPARATUS

[75] Inventors: Yuzi Ikeda; Ryo Niikawa, both of Sayama, Japan

[73] Assignee: Honda Giken Kogyo Kabushiki Kaisha, Tokyo, Japan

[21] Appl. No.: 357,575

[22] Filed: May 26, 1989

[30] Foreign Application Priority Data

Jun. 3, 1988 [JP] Japan .................. 63-135620

[51] Int. Cl.$^5$ ............................. G05B 13/00
[52] U.S. Cl. ................... 29/401.1; 29/404; 364/513; 901/8
[58] Field of Search ............ 29/401.1, 404, 407; 901/7, 8; 364/513

[56] References Cited

U.S. PATENT DOCUMENTS

| 4,488,241 | 12/1984 | Hutchins et al. | 364/513 |
| 4,683,544 | 7/1987 | Hariki | 364/513 |
| 4,786,848 | 11/1988 | Nickerson | 29/404 X |

FOREIGN PATENT DOCUMENTS

WO83/02183 6/1983 PCT Int'l Appl. .

*Primary Examiner*—Joseph M. Gorski
*Attorney, Agent, or Firm*—Armstrong, Nikaido, Marmelstein, Kubovcik & Murray

[57] ABSTRACT

A method for modifying an existing production line apparatus for adaptation to a new type of workpiece, when the apparatus includes a standardized general-purpose member and a special-purpose member which is exchangeable according to type of workpiece to be handled. A master apparatus is prepared which is mechanically identical with the general-purpose member. A special-purpose member is made that is compatible with a new type of workpiece. The special-purpose member is attached to the master apparatus and a trail operation is performed. Programming data from the trail operation necessary for operating the special-purpose member, and including teaching data for the general-purpose member are prepared and stored in a memory of the special purpose member. The programmed special-purpose member is then to attached to the general-purpose member and the production line apparatus having now incorporated the special-purpose member is operated according to the programming data.

1 Claim, 3 Drawing Sheets

METHOD OF MODIFICATION OF PRODUCTION LINE APPARATUS

BACKGROUND OF THE INVENTION:

This invention relates to a method for modifying an existing production line apparatus to adapt it to a new kind or type of workpiece and to a production line apparatus suitable for implementation of this method.

It has been known heretofore that a production line apparatus is arranged to comprise a standardized general-purpose member and a special-purpose member which is exchangeable according to type of workpiece to be handled so that the special-purpose member to be attached to the general-purpose member may be changed according to type of workpiece in order for the production line apparatus to be able to handle various types of workpieces.

According to the prior art, for modifying an existing production line apparatus in order to adapt the same to a new kind or type of workpiece, a new special-purpose member that is compatible with this new type of workpiece is manufactured and attached to the general-purpose member of the existing production line apparatus for a trial operation using a master workpiece to obtain programming data necessary for operation of the special-purpose member, this data including teaching data for the general-purpose member.

The data so obtained are stored in the controller of the production line apparatus to complete the required modification making the production line apparatus ready to resume its operation.

According to the foregoing conventional method, it takes much time before an existing production line apparatus is modified and adapted so as to be ready to resume operation. It is, therefore, much desired that a new method be developed to enable an existing production line apparatus to be modified and adapted quickly to a new type of workpiece without a trial operation of the existing production line apparatus, thereby contributing to an increased productivity.

It is, therefore, the object of the present invention to provide a production line apparatus modification method designed to satisfy such desire.

SUMMARY OF THE INVENTION:

To achieve the above object, the present invention provides method for modifying an existing production line apparatus for adaptation to a new type of workpiece, the apparatus comprising a standardized general-purpose member and a special-purpose member which is exchangeable according to the type of workpiece to be handled, the method comprising the steps of: preparing a master apparatus apart from exiting production line apparatus, which is mechanically identical with the general-purpose member; manufacturing a special-purpose member that is compatible with a new type of workpiece; attaching the special-purpose member to the master apparatus to perform a trial operation; preparing programming data from the trial operation necessary for operation of the special-purpose member, the data including teaching data for the general-purpose member; incorporating the special-purpose member into the production line apparatus and operating the production line apparatus having now incorporated the special-purpose member according to the programing data.

According to another aspect of the present invention, it be preferable that the special-purpose member is provided with a memory means to store the programing data and the general-purpose member be provided with a chuck means to receive and clamp the special-purpose member. The chuck means is provided with a connector means for connecting to the controller of the production line apparatus. A connector means for connecting to the memory means is provided at a base end portion of the special purpose member, the base end portion being the location at which the special-purpose member is clamped by the chuck means, so that when the special-purpose member is clamped by the chuck means the two connector means become connected to each other to form a closed circuit for data communication between the memory means and the controller.

The special-purpose member that is compatible with a new type of workpiece is attached to the master apparatus which is mechanically identical with the general-purpose member of the production line apparatus and test-run therewith so that programming data suitable for operation of the special-purpose member can be prepared in advance. Then, the special-purpose member is incorporated into the existing production line apparatus so as to enable the production line apparatus to resume operation outright without any trial run thereof.

In this case, according to the second aspect of the present invention, when the special-purpose member is clamped to the general-purpose member of the production line apparatus through the chuck means, a closed circuit for data communication is automatically formed between the memory means provided in the special-purpose member and the controller of the production line apparatus so that the production line apparatus is operated in accordance with the predetermined programming data for the special-purpose member stored in the memory means, consequently making it unnecessary to revise or change the programming data for the controller by a trial run of the production line apparatus each time when the special-purpose member is exchanged with another one.

BRIEF DESCRIPTION OF THE DRAWINGS:

The above and other objects and the attendant advantages of the present invention will become readily apparent by reference to the following detailed description when considered in conjunction with the accompanying drawings wherein.

Figure 1:
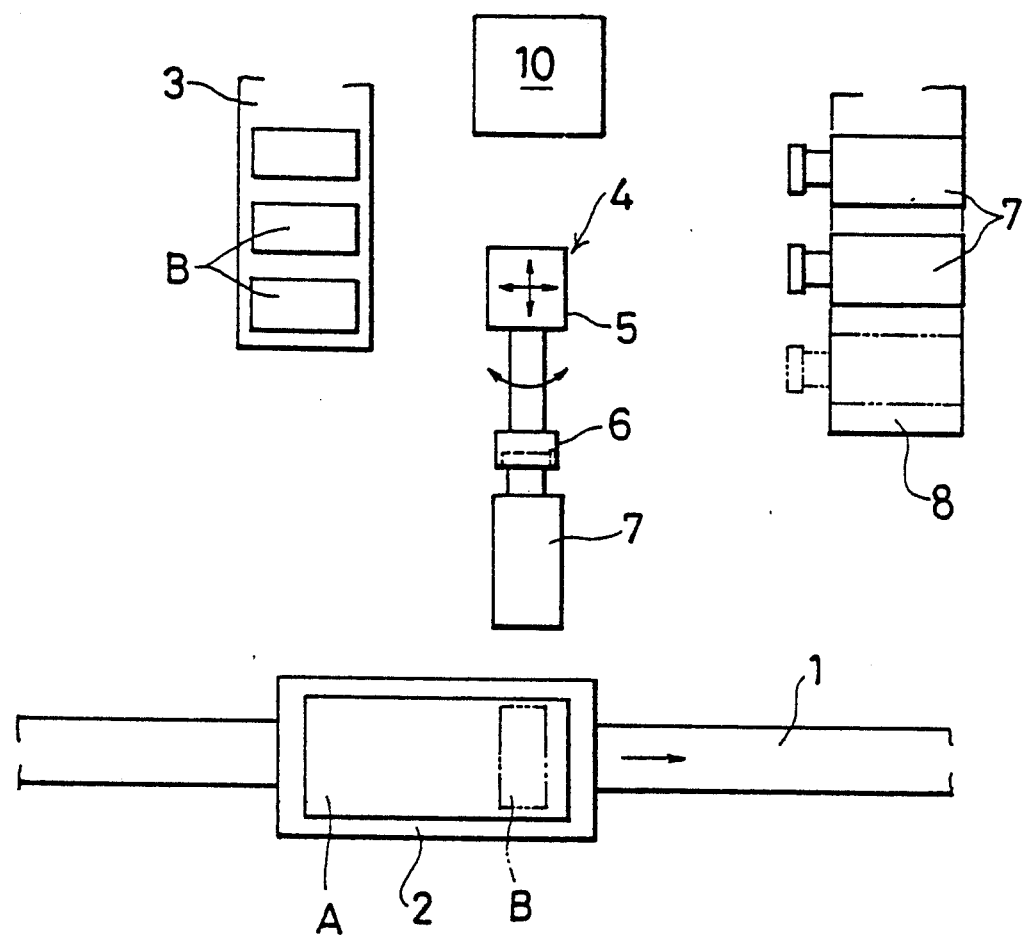
FIG. 1 is a top plan view of a production line assembly station including an apparatus according to one embodiment of the present invention.
Figure 2:
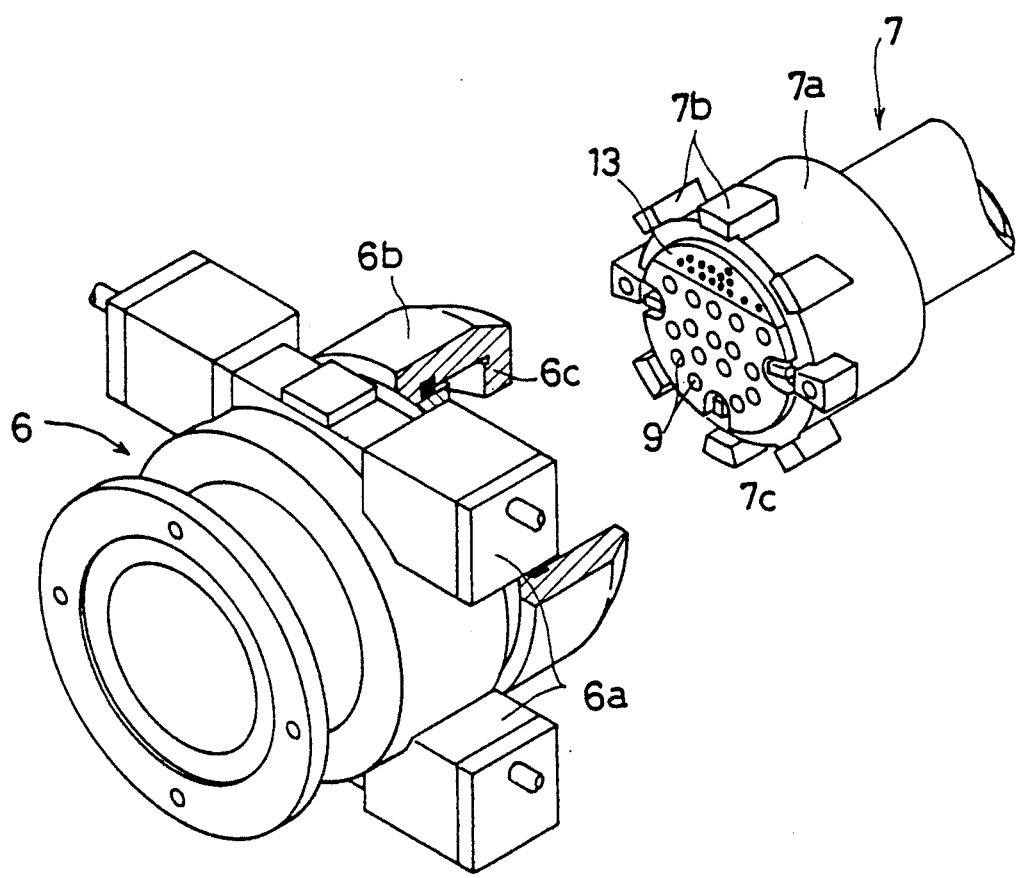
FIG. 2 is a perspective view showing a chuck means and a special-purpose member, each being separated from other.

DETAILED DESCRIPTION OF A PREFERRED EMBODIMENT:

Referring to FIG. 1, an assembly line 1 is shown, along which an article A such as a car body mounted on a carrier 2 is conveyed. A loader conveyor 3 for a component part B is provided adjacent the line 1. An assembling apparatus 4 constituting an assembly line equipment for assembling the component part B on the loader conveyor 3 to the article A on the carrier 2 includes a robot 5 constituting a general-purpose member, and a jig 7 constituting a special-purpose member. The jig 7 is clamped to the operating end of the robot 5 through a chuck means 6 as shown in FIG. 2.

The jig 7 is provided with a clamper for clamping the component part B and a fastening device for fastening the component part B to the article although they are not shown in the drawings. A plurality of alternate jigs 7 adapted respectively for handling different types of component parts or articles are placed on a stock table 8 positioned on one side of the location where the robot 5 is situated, so that any one of these jigs 7 can be selected to be attached to the robot 5.

Figure 3:
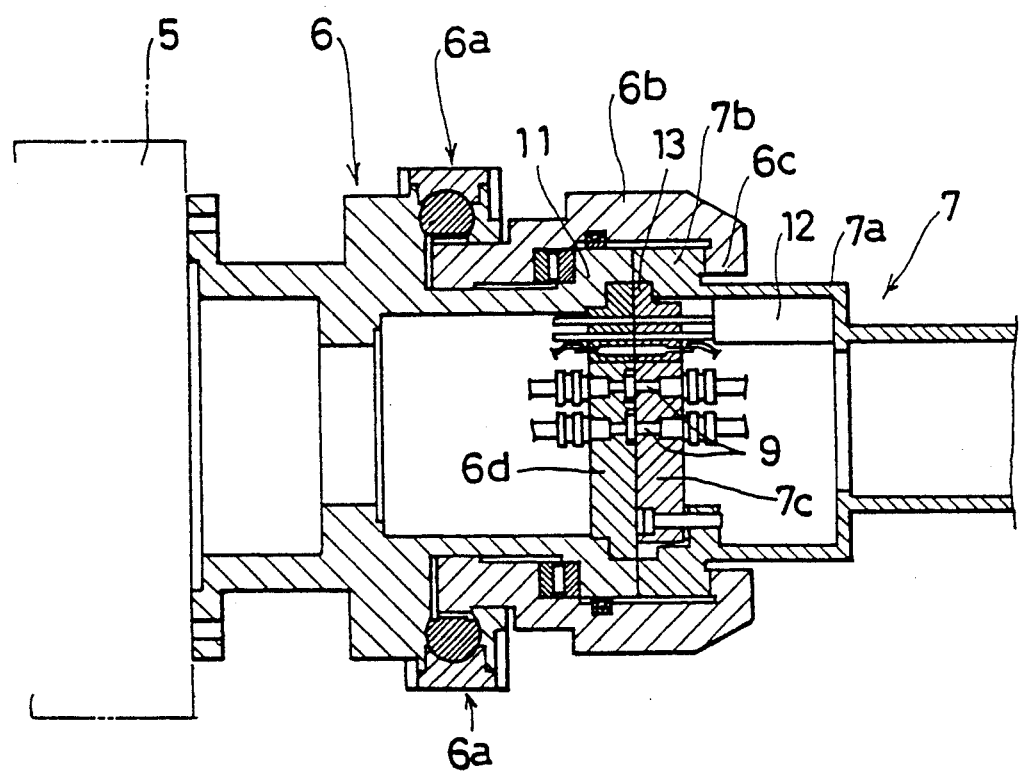
FIG. 3 is a longitudinal section view showing the chuck means and special-purpose member connected to each other.

The chuck means 6 is equipped with a chuck sleeve 6b that is rotated by a rotary actuator 6a. As the base end portion 7a of the jig 7 is inserted into the sleeve 6b and then the sleeve 6b is turned, a chuck claw 6c on the inner periphery of the front end portion of the sleeve 6b engages with an engaging projection 7b on the outer periphery of the base end portion 7a as shown in FIG. 3. As a result, the jig 7 is clamped by the chuck means 6. An end plate 6d of the chuck means 6 and an end plate 7c of the base end portion 7a which adjoin each other in the clamped position are provided with fluid joints 9 which feed operating fluid to an actuator mounted on the jig 7. In addition, the end plate 6d of the chuck means 6 is further provided with a connector 11 for connecting to a controller 10 of the assembling apparatus 4. The end plate 7c of the base end portion 7a is provided with a connector 13 connecting to a memory means 12, such as a semiconductor memory device, built in the base end portion 7a and to various sensors (not shown) elsewhere provided on the jig 7. When the jig 7 is clamped by the chuck means 6, the two connectors 11 and 13 are connected to each other to form a closed circuit for inputting signals from the sensors to the controller 10 and another closed circuit for data communication between the controller 10 and the memory means 12.

The memory means 12 stores the programming data necessary for the respective special-purpose member to perform the assembling operation, the data including the teaching data for the robot 5. The programming data are read into the controller 10 through the data communication circuit and the assembling apparatus 4 is operated according to the programming data corresponding to the type of the jig 7 actually attached to the robot 5.

When a new type of article A or component part B has been developed, a new type of the jig 7 for that new type of article A or component part B is manufactured at the assembly line equipment manufacturing division. Attached to a master robot which is mechanically identical to the robot 5, this new type of the jig 7 is then operationally tried, and programming data suitable for the new jig 7 are prepared and stored in the built-in memory means 12, all carried out at the manufacturing division.

According to this embodiment of the present invention, the assembly line can be adapted simply by introducing to the actual assembly line, a new jig 7 that can handle a newly developed type of article or component part, requiring no trial run of the existing assembly line equipment incorporating the same.

As is clear from the foregoing description, according to the present invention, the special-purpose member for a new type of workpiece or article including the programming data corresponding thereto can be readily incorporated into an existing production line apparatus and permits prompt resumption of the operation of the production line apparatus without actually performing a trial operation thereof with the production line apparatus, so that it can contribute remarkably to increasing productivity especially under today's circumstances in which new types or kinds of workpieces are developed very often.

In addition, according to the present invention, simply by having the special-purpose member clamped to the general-purpose member through the chuck means, the entire production line apparatus is operated according to the programming data stored in the memory means provided in the special-purpose member, so that it is no longer necessary to enter the programming data into the controller by trial operation of the apparatus for the new type of workpiece or article each time a special-purpose member for such a new type of workpiece or article is incorporated into the existing production line apparatus. This brings about a further improvement in productivity.

It is readily apparent that the above-described method and apparatus has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method for modifying an existing production line apparatus for adaptation to a new type of workpiece, said apparatus comprising a standarized general-purpose member and a first special-purpose member which is exchangeable according to the type of workpiece to be handled, said method comprising the steps of:
    (a) preparing, at a location other than a production line, a master apparatus standardized general-purpose member which is mechanically identical with the existing production line apparatus standardized general-purpose member;
    (b) manufacturing a second special-purpose member that includes a memory means, and is compatible with a new type of workpiece;
    (c) attaching said second special-purpose member to said master apparatus standardized general-purpose member and performing a trial operation;
    (d) preparing programming data from said trail operation necessary for operating said second special-purpose member, said data including teaching data for the existing production line apparatus standardized general-purpose member;
    (e) storing said programming data in said second special-purpose member memory means during said trial operation;
    (f) detaching said second special-purpose member from said master apparatus standardized general-purpose member and exchanging said second special-purpose member with said first special-purpose member on said existing production line apparatus standardized general-purpose member; and
    (g) operating the existing production line apparatus, having now incorporated said second special-purpose member, according to said programming data stored in said second special-purpose member memory means without further trail operation.

* * * * *